United States Patent [19]
McKenzie et al.

[11] Patent Number: 5,881,297
[45] Date of Patent: Mar. 9, 1999

[54] APPARATUS AND METHOD FOR CONTROLLING CLOCKING FREQUENCY IN AN INTEGRATED CIRCUIT

[75] Inventors: Meredith McKenzie, Cupertino, Calif.; Jerry D. Carter, Mesa, Ariz.

[73] Assignee: Intel Corporation, Santa Clara, Calif.

[21] Appl. No.: 775,783

[22] Filed: Dec. 31, 1996

[51] Int. Cl.[6] .................................................. G06F 1/32
[52] U.S. Cl. ........................ 395/750.04; 395/750.01; 395/750.02; 395/750.03; 395/750.06
[58] Field of Search ................................ 395/750.04, 550, 395/750.01, 750.03, 750.02; 327/295; 307/271; 331/14

[56] References Cited

U.S. PATENT DOCUMENTS

| | | | |
|---|---|---|---|
| 5,077,686 | 12/1991 | Rubhinstein | 395/550 |
| 5,493,684 | 2/1996 | Gephardt et al. | 395/750 |
| 5,504,910 | 4/1996 | Wisor et al. | 395/750 |
| 5,511,203 | 4/1996 | Wisor et al. | 395/750 |
| 5,561,792 | 10/1996 | Ganapathy | 395/550 |
| 5,586,332 | 12/1996 | Jain et al. | 395/750 |
| 5,778,237 | 7/1998 | Yamamoto et al. | 395/750.04 |
| 5,790,877 | 8/1998 | Nishiyama et al. | 395/750.05 |

*Primary Examiner*—Meng-Ai T. An
*Assistant Examiner*—Eric S. Thlang
*Attorney, Agent, or Firm*—Blakely, Sokoloff, Taylor & Zafman LLP

[57] ABSTRACT

A method and apparatus for reducing power in a computer system having a counter and a phase generator. The method consists of receiving an input clock signal which has a plurality of clock cycles and receiving an enable signal. If the enable signal is active, then the counter performs a divide operation. In addition, a block signal is generated when the enable signal is active to hold the output signal in its present state. The block signal is removed if the divide operation is completed or if the enable signal becomes inactive. When the enable signal is not active, then the output signal generated is equal to and in phase with the input clock signal if the enable signal is not active.

21 Claims, 10 Drawing Sheets

APPARATUS AND METHOD FOR CONTROLLING CLOCKING FREQUENCY IN AN INTEGRATED CIRCUIT

FIELD OF THE INVENTION

The present invention relates to power management techniques for computer systems. More particularly, the present invention relates to a method and apparatus for reducing the power requirements of a computer system by management of the clock driving the system components or the clock driving the components within a microprocessor.

BACKGROUND OF THE INVENTION

Power consumption poses a serious problem in modern computer systems. This is especially true in mobile systems, which are typically powered by batteries. The more power the system consumes, the less time the system can operate using a given size battery. In order to extend the operation time, while meeting the increased power demand, additional batteries may be added. Additional batteries are bulky and heavy however. Given the trend towards producing smaller and lighter mobile systems, this solution is not desirable. Alternatively, there are exotic batteries available that provide an increase in operation time without increasing the weight of the system. These batteries can, however, be quite expensive and reduction of system cost is also an important goal. Therefore, neither of these solutions is satisfactory.

The greatest amount of power consumption within a CMOS chip occurs on the leading and trailing edges of clock pulses (i.e., when a clock signal transitions from a low voltage state to a high voltage state, or vice versa). Therefore, when the operating speed of the microprocessor is increased, the number of clock pulses in a particular time period also increases, thereby increasing the power consumption of the microprocessor during this time period. Similarly, a decrease in the operating speed of the microprocessor results in a decrease in the number of clock pulses in a particular time period, thereby decreasing the power consumption of the microprocessor during this time period.

To reduce the power consumption of the system or microprocessor, many different techniques of controlling the clock are used. Typically, the clock continues to toggle during idle time, thereby needlessly consuming power. One method to reduce power by controlling the clock signal is through the use of a dynamic power management system that turns off the clock signal to components while they are idle. This method typically consists of enabling the system or processor component clocks only when the component is needed and disabling the component clocks when the components are not needed. Such a method reduces the overall power consumption of the system or microprocessor by reducing power consumed by idle components.

An alternative method, which can be used independently or in conjunction with the above method of enabling or disabling different components, is to reduce the operating frequency of the clock signal. This method is referred to as frequency reduction. Although it is not always desirable for the system or processor to run at a reduced speed, it can be a useful method of reducing power during times in which it is not necessary for the processor to run at full speed. Frequency reduction is usually accomplished by dividing the clocking signal supplied to the components.

Figure 1:
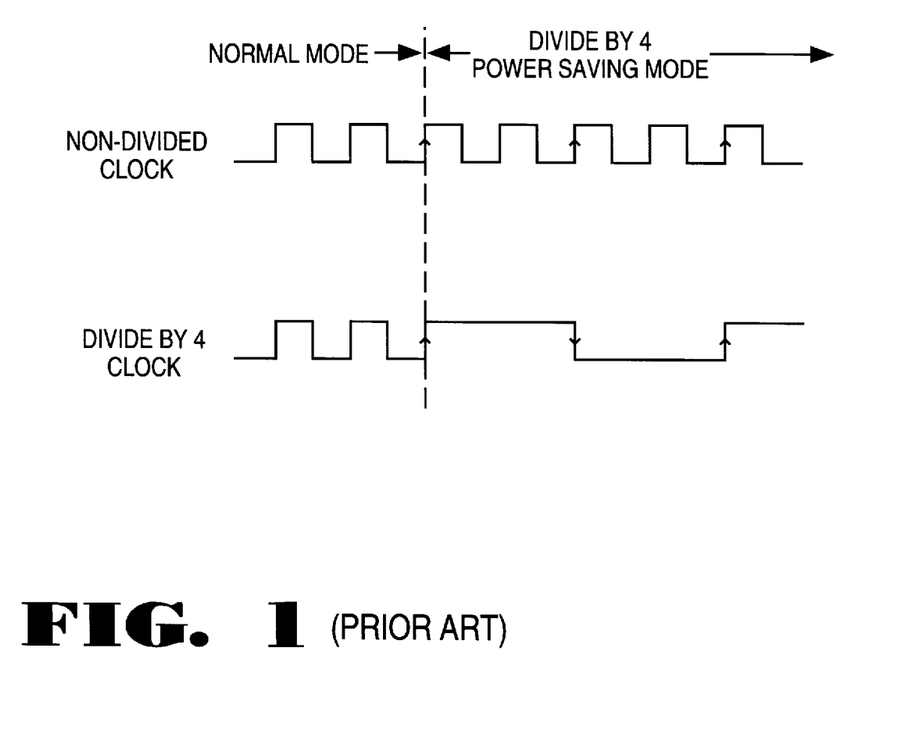
FIG. 1 is a timing diagram illustrating the relationship between the non-divided clock and the divided clock in a prior art divide mode.

Although this method of dividing the clock is useful in reducing the power consumption of the system, such a method results in the complication of system and component design. For example, in a system in which the microprocessor creates its internal clocks based on a system clock, the system design is complicated when the microprocessor uses a divided clock for power savings. In such a system, depending upon the divide value selected, the falling edges of a divided clock may actually correspond to the rising edge of a non-divided clock. For example, as shown in FIG. 1, in a conventional divide-by-four mode, the falling edge of the divided clock occurs during a rising edge of the non-divided clock. Due to this problem, the external clock (to the microprocessor), which the internal clocks are created from, cannot be used to track the internal clock signals unless additional signals are brought off the microprocessor. The fact that the asserting edges of divided clocks and non-divided clocks do not align also results in a complication of component interface design.

In addition, the above divide method results in the complication of device testing of the component during the divided clock power saving mode. For example, in a dual phase design it is common to combine two phases into a single tester cycle to increase the maximum testing speed. Device timing specifications are normally referenced to occur relative to a specific phase. When the occurrences of the phases are not at a consistent position (as when the deasserting edges of some divided clock align with asserting edges of non-divided clocks) testing becomes more complicated.

Furthermore, in large divide modes, such as divide by 8, 10, 16, etc., there is a long latency associated with waking up from divide mode. In order to prevent glitches on the clock signal, which may adversely affect data integrity, a clock divide must be completed before coming out of divide mode. Therefore, although the system components or processor components may be ready to wake up from the slower operating mode, the clock signal cannot return to its normal operating frequency until it has completed a divide cycle. Therefore, if the components are ready to wake up while in divide by 16, but the clock divide circuitry has just begun the divide count, the component must remain in the slower frequency mode until the divide count reaches 16, or until the divide cycle is complete.

SUMMARY OF THE INVENTION

One desire of the present invention is to reduce power consumption in a computer system or microprocessor through the use of a reduced frequency clock without complicating the testing of the system.

Another desire of the present invention is to reduce power consumption in a computer system or microprocessor through the use of a reduced frequency clock while minimizing the complexity of the circuitry required.

Another desire of the present invention is to reduce power consumption in a computer system or microprocessor through the use of a reduced frequency clock while minimizing the complication of the system or component design.

A method and apparatus are described for reducing power in a computer system having a counter and a phase generator. The method includes a step of receiving an input clock signal which has a plurality of clock cycles and receiving an enable signal. If the enable signal is active, then the counter performs a divide operation. In addition, a block signal is generated when the enable signal is active to hold the output signal in its present state. The block signal is removed if the divide operation is completed or if the enable signal becomes inactive. When the enable signal is not active, then the output signal generated is equal to and in phase with the input clock signal if the enable signal is not active.

Other desires, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 2:
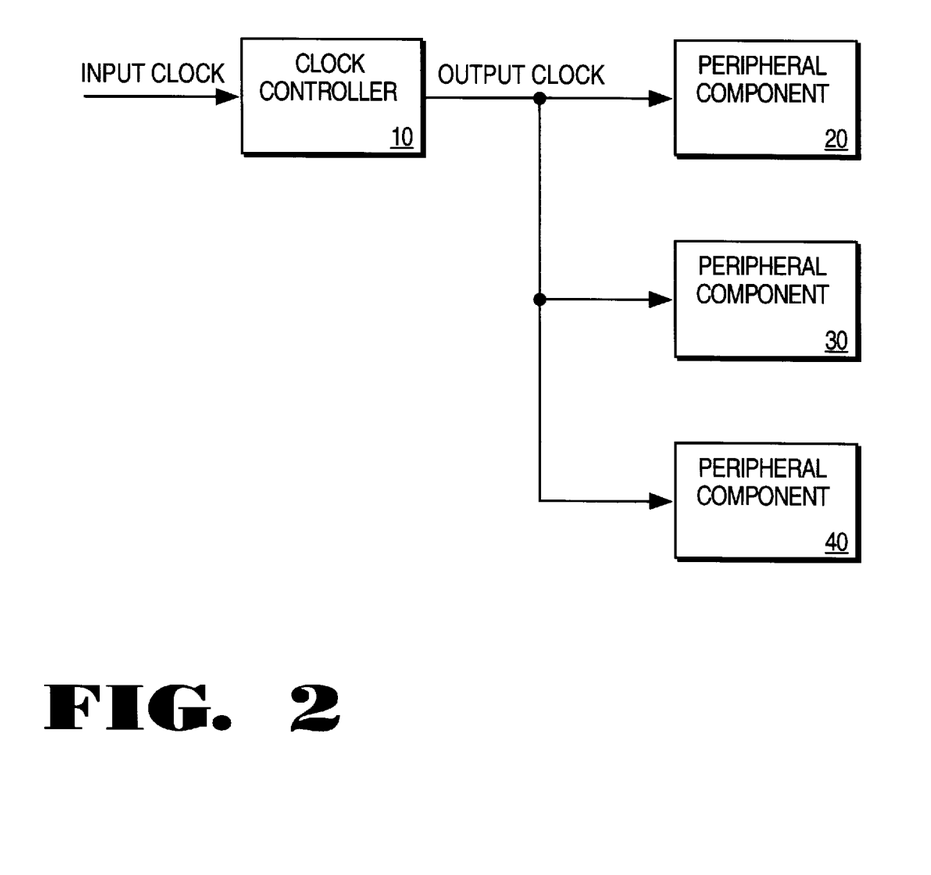
FIG. 2 is a block diagram of a system showing the input clock to the system and the relationship between the input clock to the system and the output clock from the clock controller and the peripheral components.

A method and apparatus for reducing power in a computer system or microprocessor are described. As shown in FIG. 2, for one embodiment of the present invention, there is an input clock to the computer system or microprocessor, a clock controller 10, and at least one peripheral component 20. The clock controller has as its input the input clock and has as its output an output clock. The output clock is to be used as a clock for at least one peripheral component.

Figure 3:
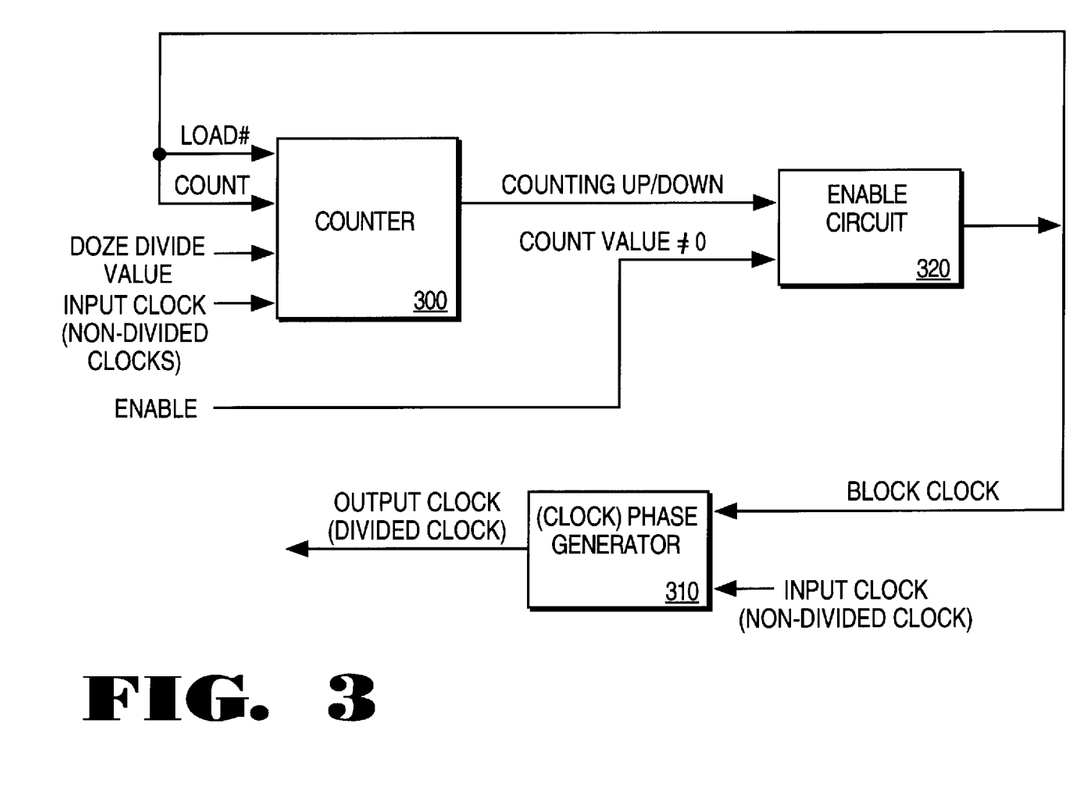
FIG. 3 is a block diagram of an apparatus to implement the reduced clock frequency method of one embodiment of the present invention.

FIG. 3 shows a block diagram of one embodiment of the clock controller of FIG. 2, where the clock controller is implementing a reduced frequency clocking technique. As is shown, the clock controller includes a counter 300, a phase (or clock) generator 310, and an enabling circuit 320.

The phase generator 310 has as inputs the input clock (non-divided clock) to the computer system or microprocessor and the block signal. Phase generator 310 outputs the output clock (divided clock). When the block signal is active, the output clock is blocked in the manner described in more detail below. The block signal is created by the counter 300 and enabling circuit 320. When the enable signal is inactive, the enabling circuit produces a block clock signal that is inactive. Therefore, the output clock is not blocked, and is equal to and in phase with the input clock. When the enable signal is active, however, the enabling circuit 320 allows the counting down signal from the counter 300 to be used as the block signal, the load# signal, and the count signal. The load# signal is inactive when the block signal and the count signal are active. For example, if the block signal and the count signal are active high, the load# signal is an active low.

The counter 300 has as inputs a "doze" divide value (controlled via software or hardware not shown), the load# signal, and the count signal. When the load# signal is active, the doze divide value is loaded into the counter. When the count signal is active, the counter counts down and decrements the value in the counter until the counter value reaches zero or until a new count value is loaded. Upon the completion of a count sequence, when the count value is zero, the counting down signal becomes inactive, as the counter is no longer counting down. An inactive counting down signal, and an active enable signal, produce an inactive block signal, an active load# signal, and an inactive count signal. Thus, the counter is no longer counting (inactive count signal), the divide value is loaded into the counter (active load# signal), and the output clock (divided clock) is unblocked (inactive block signal). Because the doze divide value is loaded into the counter, the counter value is no longer equal to zero, and the counter counts again, thus the counting signal is active, resulting in an active block signal, an active count signal, and an inactive load# signal. Because the block signal is again active, the output clock is blocked, and the above cycle is repeated. In addition, if the enable signal is removed at any time during the above sequence, the enable circuit outputs an inactive signal, and therefore the block clock signal is inactive, thereby the output clock is not blocked and it is equal to and in phase with the input clock. Also, when the output of the enabling circuit is inactive, the count signal is inactive and the load# signal is active.

The embodiment of the present invention has the advantage that while in a large divide mode there is no need to wait for a cycle to complete prior to switching back to non-divide mode as divide value switches can happen at any time. This can help to improve latency issues. This can be achieved at any time by removing the enable signal, as described above.

Although the above embodiment uses a counter that counts down from the loaded doze divide value to zero, an alternative embodiment uses a count circuit that counts from the doze divide value to any predetermined value. Similarly, the counter counts up from a predetermined value to the doze divide value.

Figure 4A:
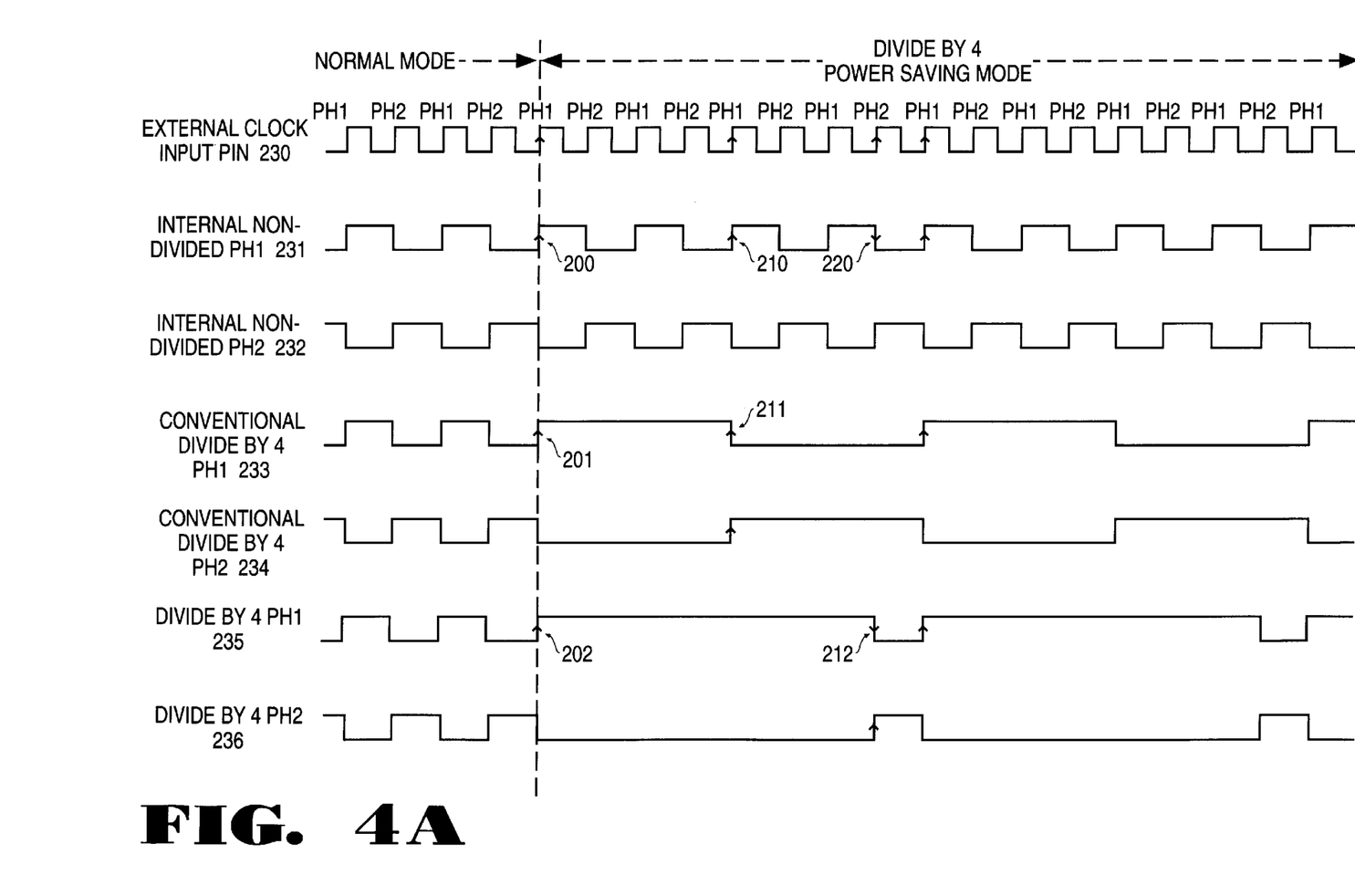
FIG. 4(a) is a timing diagram illustrating the non-divided clocks and divided clocks of a dual phase system in the reduced clock frequency mode of one embodiment of the present invention, in comparison to the prior art divide mode for reducing clock frequency.

It is desirable for the divided clock and the non-divided clock to have asserting and deasserting edges occur at the same time, independent of the divide value. As shown in FIG. 4(a), in a divide scheme of divide-by-four, the first asserting edge of the conventional divide PH1 (201) corresponds to the asserting edge of the non-divided PH1 (200). However, the conventional divide PH1 deasserting edge (211) corresponds to an asserting edge of the non-divided PH1 (210), not a deasserting edge. In contrast, one embodiment of the present invention has an asserting edge of PH1 (202) that corresponds to an asserting edge of the non-divided PH1, and the deasserting edge of PH1 (212) corresponds to the deasserting edge of the non-divided PH1

(220). In a similar manner, the asserting edges and deasserting edges of the conventional divided PH2 do not correspond to asserting and deasserting edges of the non-divided PH2, whereas one embodiment of the present invention has asserting and deasserting edges of the divided PH2 that correspond to asserting and deasserting edges of the non-divided PH2. As discussed above, having a divided (reduced frequency) clock that has asserting edges corresponding to non-divided asserting edges, and deasserting edges corresponding to non-divided deasserting edges, helps to simplify both system and component design.

Figure 4B:
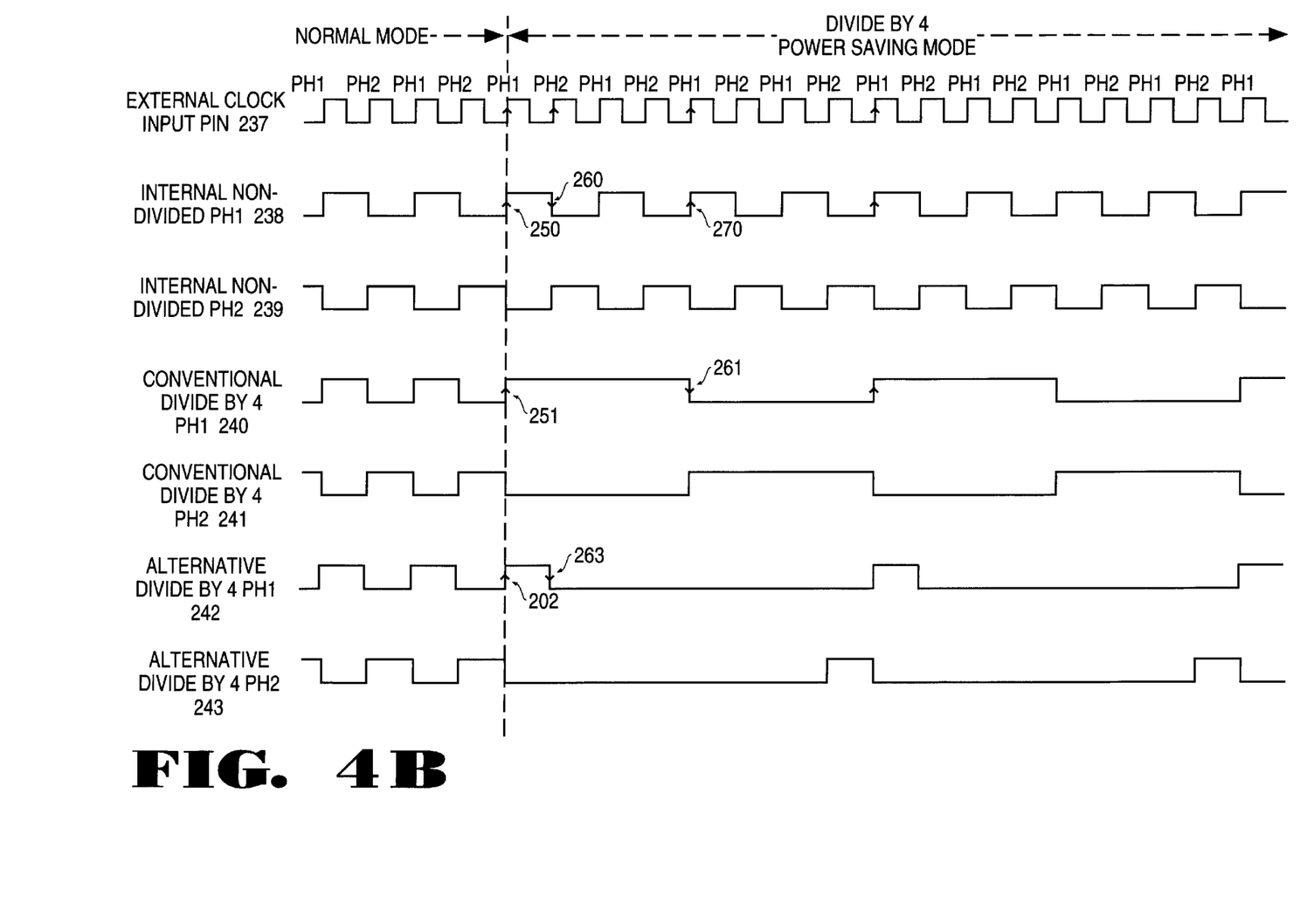
FIG. 4(b) is a timing diagram illustrating the non-divided clocks and divided clocks of a dual phase system in an alternative reduced clock frequency mode, in comparison to the prior art divide mode for reducing clock frequency.

FIG. 4(b) shows a divide technique that is an alternative embodiment of the present invention. As discussed above, in a divide scheme of divide-by-four, the asserting edge of the conventional divide PH1 (251) corresponds to an asserting edge of the non-divide PH1 (250), but the deasserting edge of the conventional divide PH1 (261) corresponds to an asserting edge of the non-divide PH1 (270), not a deasserting edge. For another embodiment of the present invention, the alternative divide PH1 has an asserting edge (252) that corresponds to the asserting edge of the non-divided PH1 (250) and a deasserting edge (263) that corresponds to a deasserting edge of the non-divided PH1 (260). Therefore, the alternative divided clock scheme also simplifies the system and component design by having a divided (reduced frequency) clock that has asserting edges corresponding to non-divided asserting edges, and deasserting edges corresponding to non-divided deasserting edges.

The present embodiment helps to simply the testing of the system or microprocessor. For example, in testing a dual phase microprocessor design, it is common to combine two internal phases into a single tester cycle to increase the maximum testing speed. Device timing specifications are normally referenced to occur relative to a specific phase, and therefore are referenced to occur in either the first half of the tester cycle or the second half of the tester cycle. Testing is simplified by the present embodiment by forcing the occurrences of the phase clocks to occur at a consistent position relative to the tester cycle (e.g., PH1 always occurs at the beginning of the cycle while PH2 always occurs in the middle, independent of the divide value).

Figure 4C:
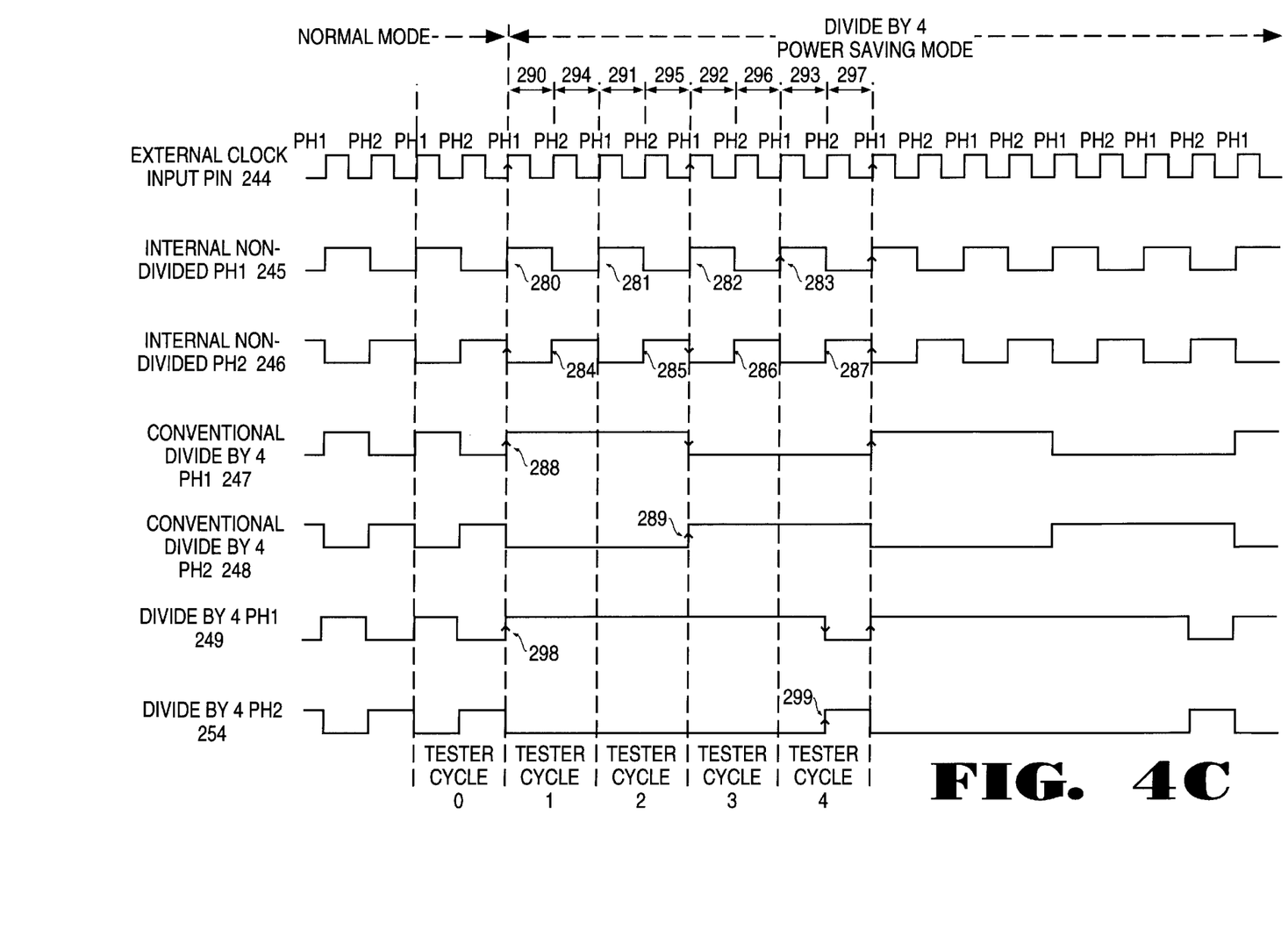
FIG. 4(c) is a timing diagram illustrating the tester clock with its corresponding tester cycles, the non-divided clocks, and the divided clocks of a dual phase system in the reduced clock frequency mode in comparison to the prior art divide mode for reducing clock frequency.
Figure 4D:
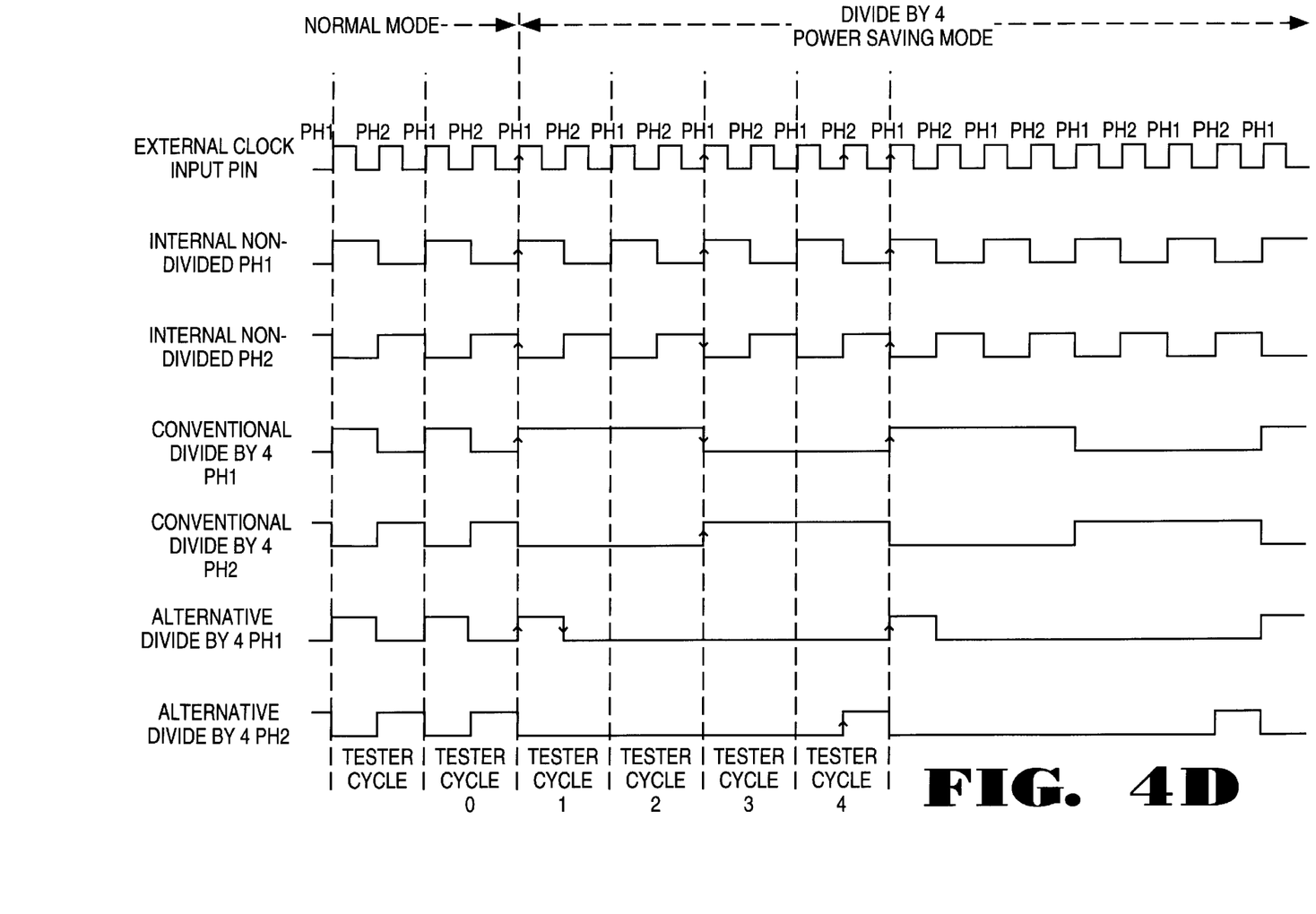
FIG. 4(d) is a timing diagram illustrating a divide clock with an active phase during one half of a tester cycle.

As shown in FIG. 4(c), with one embodiment of the present invention the occurrences of phase clocks are at a consistent position relative to the tester cycle, thus, helping to simplify the testing of the device during a reduced clock frequency mode. The first half of the tester cycle (290, 291, 292, 293) always corresponds to an occurrence of the internal non-divided PH1 (280, 282, 282, 283) and the second half of the tester cycle (294, 295, 295, 296) corresponds to an occurrence of the internal non-divided PH2 (284, 285, 286, 287). During a conventional divide mode however, this is not the case. Although the first half of tester cycle 1 (290) corresponds to an occurrence of the internal divided PH1 (288), the first half of tester cycle 3 (292) corresponds to the internal divided PH2 (289), not a PH1. In contrast, for one embodiment, the first half of tester cycle 1 (290) corresponds to an occurrence of the divided PH1 (298) and the second half of tester cycle 4 (297) corresponds to an occurrence of the divided PH2 (299). Although the second half of tester cycles 2 and 3 have an active internal divided PH1, this does not adversely affect the tester data because there have not been any transitions of the clock, nor is the clock transitioning at that tester time. Without any clock transitions, the internal circuitry clocked by the divided PH1 is simply in the same state that it was in during the first half of tester cycle 1. Therefore, through the use of the above divide method, the tester can still test for PH1 occurrences during the first half of a tester cycle and PH2 occurrences during the second half of the tester cycle. FIG. 4(d) illustrates an embodiment where the occurrences of the phase clocks are at a consistent position relative to the tester cycle. In FIG. 4(d), signal "Alternative Divide by 4 PH1" returns to an inactive state prior to the second half of tester cycle 1. Thus, in contrast to the "Divide by 4 PH1" (249) signal of FIG. 3, the second half of tester cycles 2 and 3 have an inactive internal divided PH1.

Figure 6:
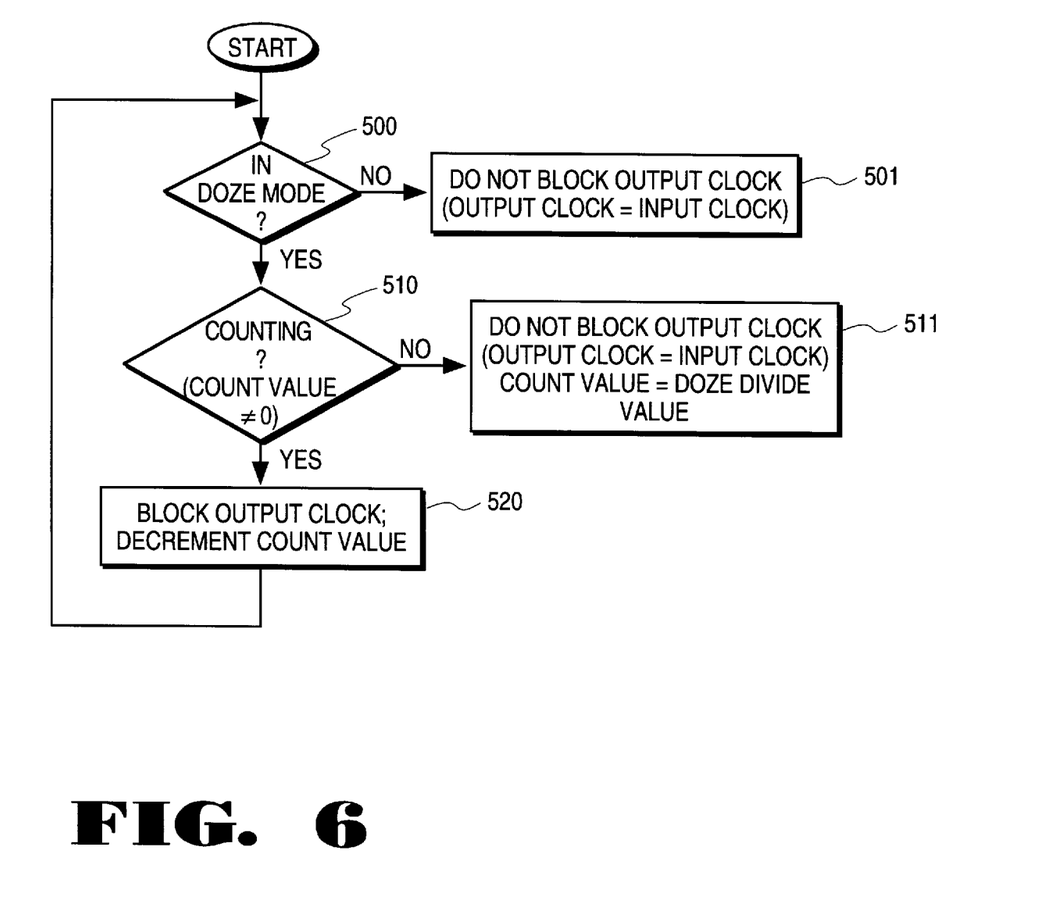
FIG. 6 is a flow chart of a method for dividing a clock signal for reducing power consumption.

The divided clocks described above can be created by the method shown in the flow chart of FIG. 6, the system determines in step 500 if it is in a "doze mode," which is a reduced frequency mode. If the system is not in doze mode, then the output clock is not blocked and the output clock equals the input clock (step 501). However, if the system is in doze mode, then in step 510, the system determines if it is counting, which is true if the count value does not equal zero. If the system is not counting, the count value is set equal to the "doze" divide value and the output clock is not blocked (step 511). If the system is counting, the count value equal zero, then the output clock is blocked and the count value is decremented (step 520). In this manner, the divided clocks described above are created.

Figure 5A:
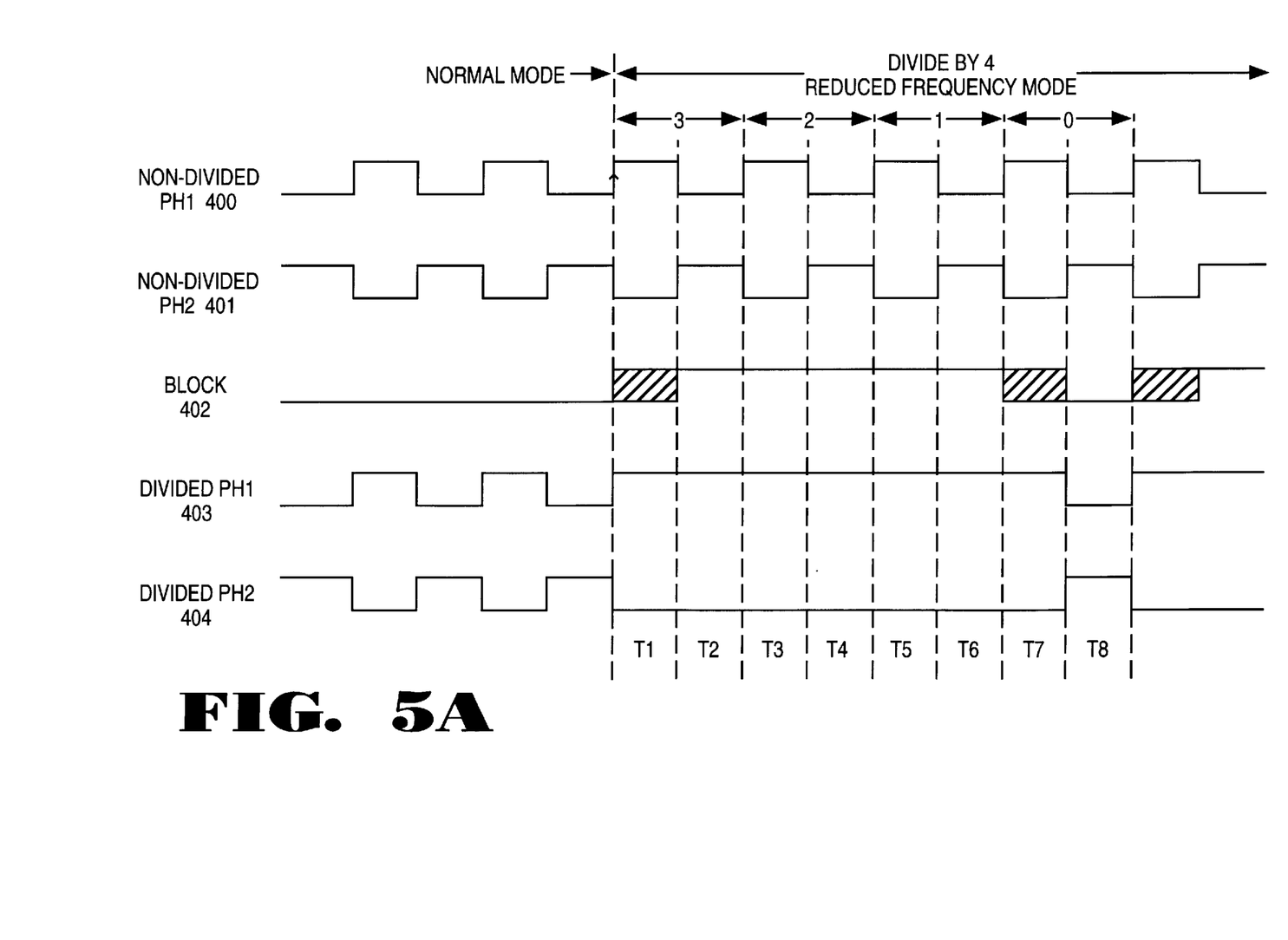
FIG. 5(a) is a timing diagram illustrating the non-divided and divided clocks of a dual phase system in a reduced clock frequency mode of divide-by-four, with the corresponding block signal used to produce the divided clocks.
Figure 5B:
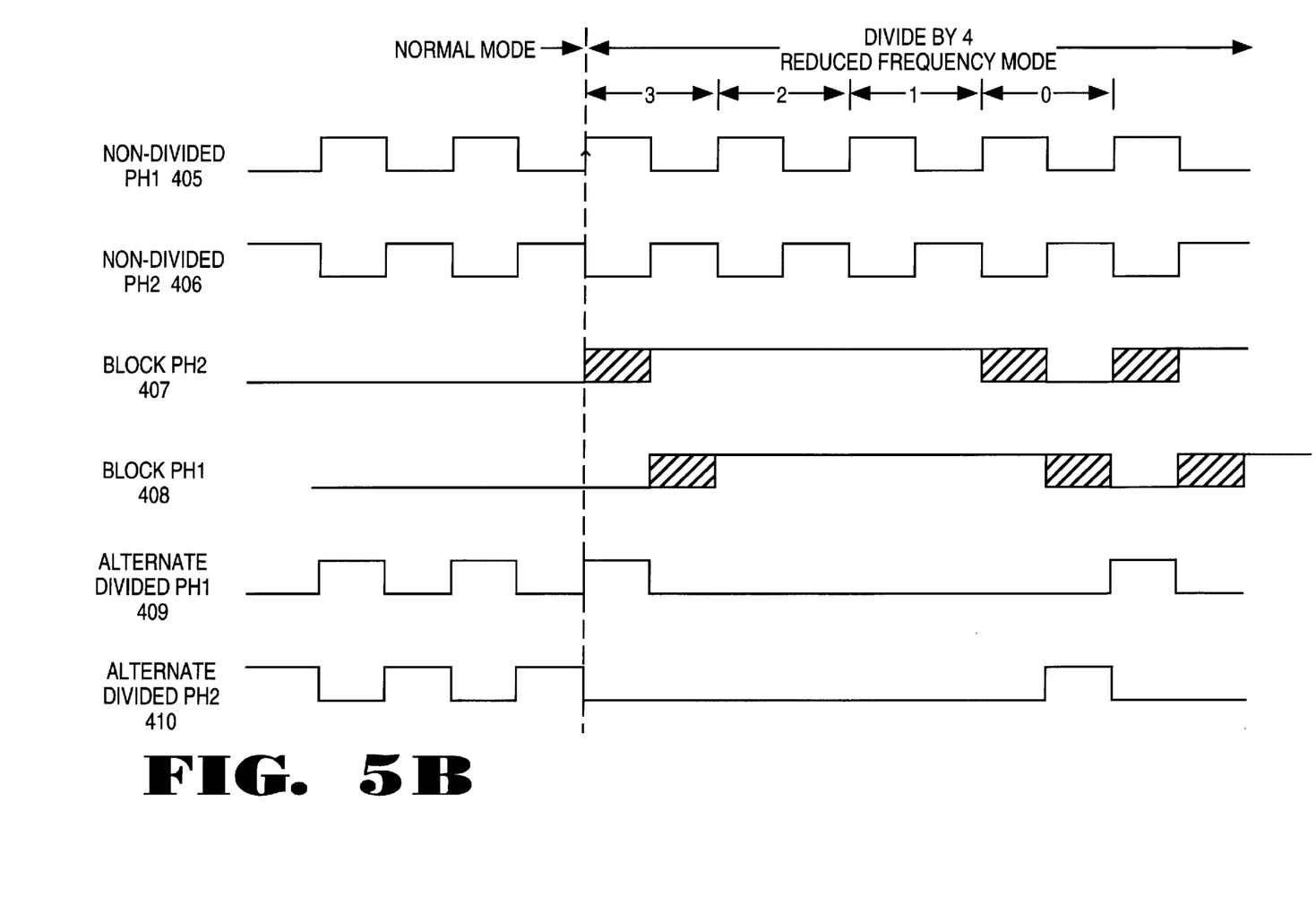
FIG. 5(b) is a timing diagram illustrating the non-divided and divided clocks of a dual phase system in an alternative reduced clock frequency mode of divide-by-four, with the corresponding block signals used to produce the divided clocks.

To create the divided clocks of one embodiment, a block signal is used. For illustration of the block signal, see FIG. 5(a). A scheme for divide-by-four is shown in FIG. 5(a) for illustration purposes only. Alternative divide values could be used in the same manner as the divide-by-four value. For one embodiment of the divide-by-four reduced frequency mode, the block signal is activated during T1. When the block signal is active, the divided clocks, which arc based off of the non-divided clocks, are blocked from transitioning, thus the divided clocks are forced to remain in the state of the non-divided clock before the block signal was activated. When the block signal becomes active during T1, non-divided PH1 is high and non-divided PH2 is low. As long as the block signal is active divided PH1 and divided PH2 are forced to remain high and low respectively, because that is the state that the non-divided clocks were in when the block signal became active. When the block signal is deactivated, during T7, the non-divided PH1 is in the high state and the non-divided PH2 is in the low state. Because the divided PH1 is already in the high state and the divided PH2 is already in the low state, the divided clocks do not transition. During T8, however, the block signal is no longer active, and the non-divided PH1 transitions from high to low. Therefore, the divided PH1 transitions to the low state. Similarly, the divided PH2 transitions to the high state during T8. FIG. 5(b) illustrates an alternative to the above reduced frequency scheme where separate block signals are used for the different phases.

The embodiment of the present invention helps to reduce power consumption of a computer system or microprocessor through a method and apparatus of reducing the clock frequency. The embodiment is an improvement over a prior art simple divide clock methodology by simplifying system and component design. For example, in a system in which the microprocessor creates its internal clocks based on a system clock, the embodiment of the present invention helps to simplify the system design by making it possible to have an external clock tracker generating signals that always correspond with the microprocessor's internal clock signals. Furthermore, the interface of signals derived from divided and non-divided clocks is simplified because the asserting and deasserting edges of similar clocks always align. For example, in a dual phase design, the rise of PH1 non-divided occurs at the same time as the rise of PH1 divided, for any divide value. Thus, the component design is also simplified.

The embodiment of the present invention helps to reduce power consumption of a computer system. In addition, the embodiment of the present invention can be used in conjunction with other energy conservation techniques to further enhance the energy conservation of the system.

In the foregoing application, the invention has been described with reference to specific exemplary embodiments thereof. It will, however, be evident that various modifications and changes may be made thereto without depleting from the broader spirit and scope of the invention as set forth in the appended claims. The specification and drawings are, accordingly, to be regarded in an illustrative rather than a restrictive sense.

What is claimed is:

1. A method for controlling clock frequency in a computer system, the computer system having a counter and a phase generator, the method comprising the steps of:
   receiving an input clock signal having a plurality of input clock cycles;
   receiving an enable signal;
   if the enable signal is not active, generating an output signal in a first state, wherein the first state comprises the output signal operating in phase with the input clock signal; and
   if the enable signal is active:
     performing a divide operation with the counter; and
     generating a block signal configured to move the output signal to a second state, wherein the second state comprises the output signal held at a set value;
     transitioning to the second state on edges of the output signal that align with the input clock signal; and
     removing the block signal if the divide operation is complete or if the enable signal becomes inactive.

2. The method of claim 1, wherein the step of performing a divide operation further comprises the steps of:
   receiving a doze divide value, a load signal, and a count signal;
   outputting a counting signal;
   loading the doze divide value into the counter when the load signal is asserted;
   decrementing the value in the counter when the count signal is asserted;
   outputting an active counting signal when the counter is counting; and
   deactivating the counting signal when the counter is loading.

3. The method of claim 2 wherein the step of generating the block signal in response to the doze enable signal being active comprises the step of:
   setting the block signal equal to the counting signal when the doze enable signal is active.

4. The method of claim 2, further comprising the step of:
   asserting the count signal when the value in the counter does not equal zero.

5. The method of claim 2, further comprising the step of:
   asserting the load signal when the counter value equals zero.

6. The method of claim 3, further comprising the step of:
   using an active block signal as an active count signal.

7. The method of claim 3, further comprising the step of:
   using an active block signal as an inactive load signal.

8. The method of claim 1 wherein the step of performing a divide operation further comprises the step of:
   receiving a doze divide value, a load signal, and a count signal;
   outputting a counting signal;
   loading a first value into the counter when the load signal is asserted;
   incrementing the value in the counter when the count signal is asserted;
   outputting an active counting signal when the counter is counting; and
   deactivating the counting signal when the counter is loading.

9. The method of claim 8, wherein the step of generating the block signal in response to the doze enable signal being active comprises the step of:
   setting the block signal equal to the counting signal when the doze enable signal is active.

10. The method of claim 8, further comprising the step of:
    asserting the count signal when the value in the counter does not equal the doze divide value.

11. The method of claim 8, further comprising the step of:
    asserting the load signal when the counter value equals the doze divide value.

12. The method of claim 8, further comprising the step of:
    using an active block signal as an active count signal.

13. The method of claim 8, further comprising the step of:
    using an active block signal as an inactive load signal.

14. An apparatus for reducing power consumption in a computer system, comprising:
    means for receiving an input clock signal having a plurality of input clock cycles;
    means for receiving a doze enable signal;
    means for producing an output clock signal;
    means for performing a divide operation in response to receipt of an active doze enable signal;
    means for generating a block signal, in response to the doze enable signal being active, to move the output clock signal to a first state, wherein the first state comprises the output signal held at a set value, the move to the first state occurring on transitioning edges of the output clock signal that align with the input clock signal;
    means for removing the block signal, in response to the doze enable signal becoming inactive or the divide operation completing, to release the output clock signal; and
    means for moving the output signal to a second state, wherein the second state comprises the output signal operating in phase with the input clock signal.

15. The apparatus of claim 14 for reducing power consumption, wherein the means for performing a divide operation further comprises:
    means for receiving an input divide value, a load signal and a count signal;
    means for outputting a counting signal;
    means for loading the doze divide value into the counter when the load signal is asserted;
    means for decrementing the value in the counter when the count signal is asserted;
    means for activating the counting signal when the counter is counting; and
    means for deactivating the counting signal when the counter is loading.

16. The apparatus of claim 14 for reducing power consumption, wherein the means for performing a divide operation further comprises:

means for counting from a first value to a second value; and means for outputting a counting signal when the counter is counting from the first value to the second value.

17. The apparatus of claim 16 for reducing power consumption, wherein the means for generating a block signal further comprises:

a means for setting the block signal equal to the counting signal when the doze enable signal is active.

18. The apparatus of claim 15 for reducing power consumption, wherein the means for generating a block signal further comprises:

a means for setting the block signal equal to the counting signal when the doze enable signal is active.

19. An apparatus for reducing the power consumption in a computer system by controlling the clocking frequency, the apparatus comprising:

a clock generation circuit capable of providing a doze mode clock, the clock generation circuit coupled to receive an input clock signal and a blocking signal;

an enabling circuit receiving a doze enable signal and a counting signal, and coupled to the clock generation circuit to provide the blocking signal to the clock generation signal;

a counting circuit coupled to the enabling circuit, the counting circuit outputting the counting signal indicating when the counting circuit does not contain a predetermined end counting value;

the counting circuit coupled to receive a doze divide value, a load signal and a count signal, the load signal indicating when the doze divide value is to be loaded into the counting circuit and the count signal indicating when the counting circuit is counting; and the counting circuit counting from the doze divide value to the predetermined end counting value when the count signal is active.

20. The apparatus of claim 19, wherein the enabling circuit is an AND gate, the AND gate receiving as inputs the counting signal and the doze enable signal, and outputting the blocking signal.

21. The apparatus of claim 19, wherein the blocking signal is equal to the count signal, and is inversely equal to the load signal.

* * * * *

UNITED STATES PATENT AND TRADEMARK OFFICE
CERTIFICATE OF CORRECTION

PATENT NO. : 5,881,297
DATED : March 9, 1999
INVENTOR(S) : McKenzie et al.

It is certified that error appears in the above-identified patent and that said Letters Patent is hereby corrected as shown below:

Column 6,
Line 30, delete "arc" and insert -- are --.

Signed and Sealed this

Thirtieth Day of September, 2003

JAMES E. ROGAN
*Director of the United States Patent and Trademark Office*